United States Patent [19]

Tsao

[11] Patent Number: 5,184,133
[45] Date of Patent: Feb. 2, 1993

[54] ISAR IMAGING RADAR SYSTEM

[75] Inventor: Sherman H. Tsao, Plano, Tex.

[73] Assignee: Texas Instruments Incorporated, Dallas, Tex.

[21] Appl. No.: 798,459

[22] Filed: Nov. 26, 1991

[51] Int. Cl.$^5$ .............................................. G01S 13/90
[52] U.S. Cl. ...................................... 342/25; 342/195
[58] Field of Search ................... 342/25, 192, 193, 195

[56] References Cited

U.S. PATENT DOCUMENTS

| | | | |
|---|---|---|---|
| H741 | 2/1990 | Powell et al. | 342/25 |
| 4,132,989 | 1/1979 | Arens | 342/25 |
| 4,471,357 | 9/1984 | Wu et al. | 342/25 |
| 4,546,355 | 10/1985 | Boles | 342/179 |
| 4,786,906 | 11/1988 | Krogager | 342/25 |
| 4,855,747 | 8/1989 | Steinberg | 342/179 |
| 4,924,229 | 5/1990 | Eichel et al. | 342/25 |
| 4,975,704 | 12/1990 | Gabriel et al. | 342/25 |
| 4,985,704 | 1/1991 | Smith | 342/25 |
| 5,068,597 | 11/1991 | Silverstein et al. | 324/77 D |

Primary Examiner—John B. Sotomayor
Attorney, Agent, or Firm—Richard L. Donaldson; René E. Grossman

[57] ABSTRACT

A method for removing range migration effects that produce doppler smearing in Inverse Synthetic Aperture Radar (ISAR) system (20) image of moving target (50) first generates a synthetic aperture radar image in the zero doppler cells from the target by summing a plurality of ISAR radar data points. Next, the method and system compensate each of the data points by a factor representing the effect of non-zero doppler frequency shift in said data points. Further, the method and system compensate the generated ISAR image for non-zero doppler frequency shift from the target using the compensated data points. This method and system may be used in an ISAR system doppler processor to reduce or eliminate doppler smearing in ISAR images.

25 Claims, 3 Drawing Sheets

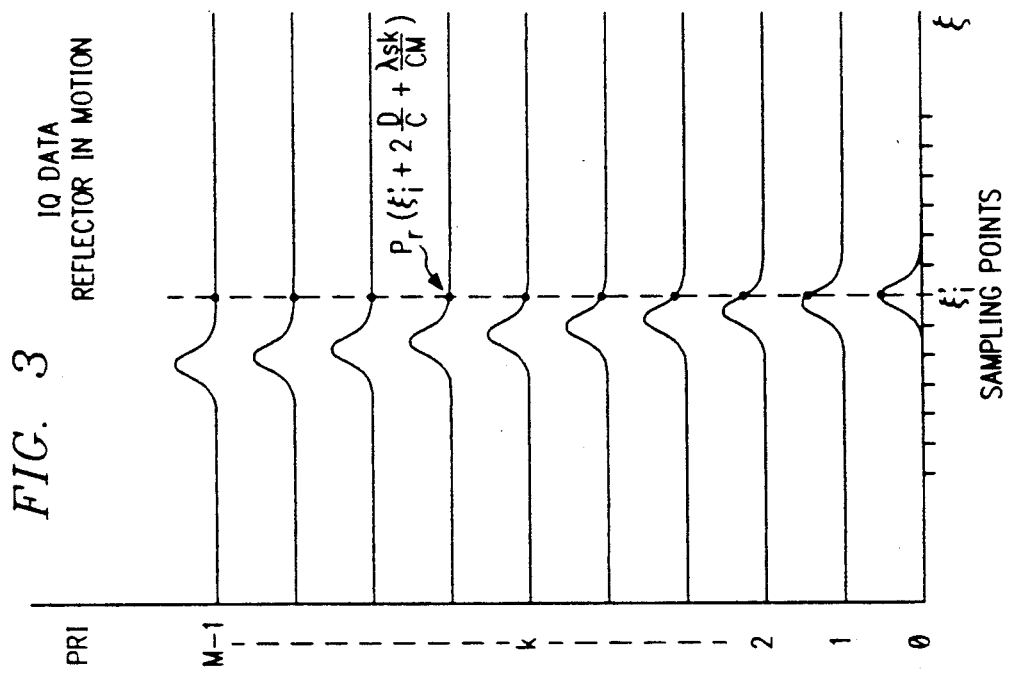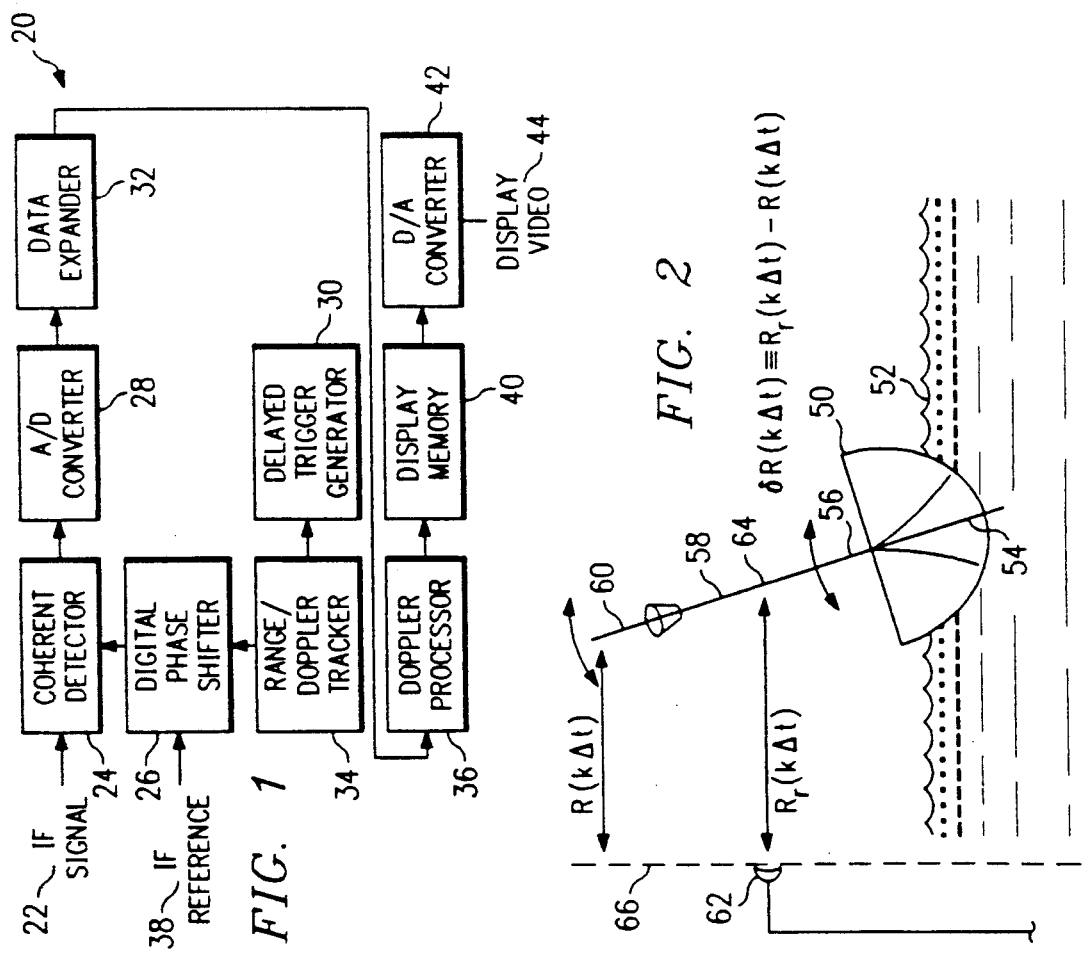

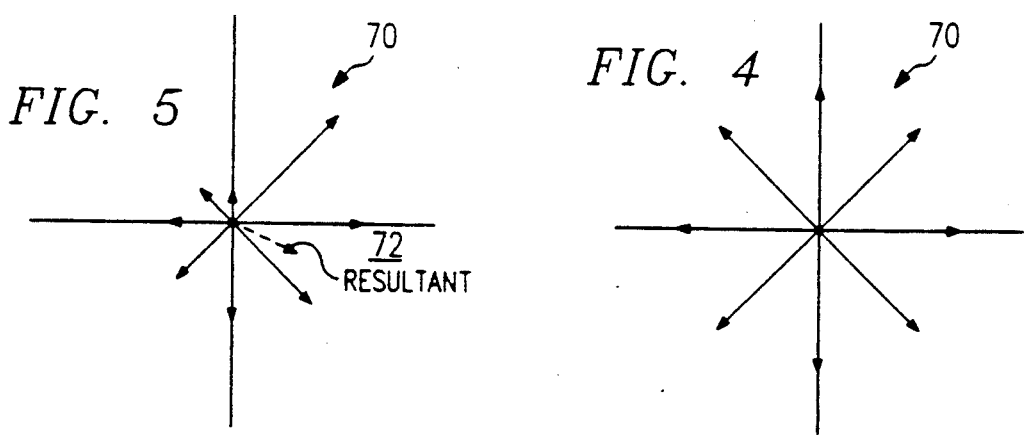
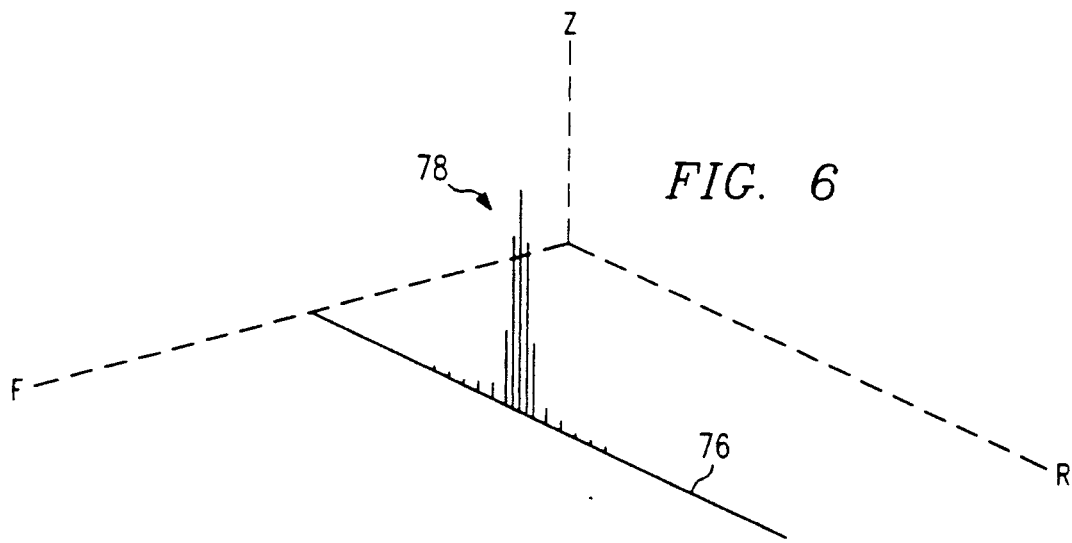
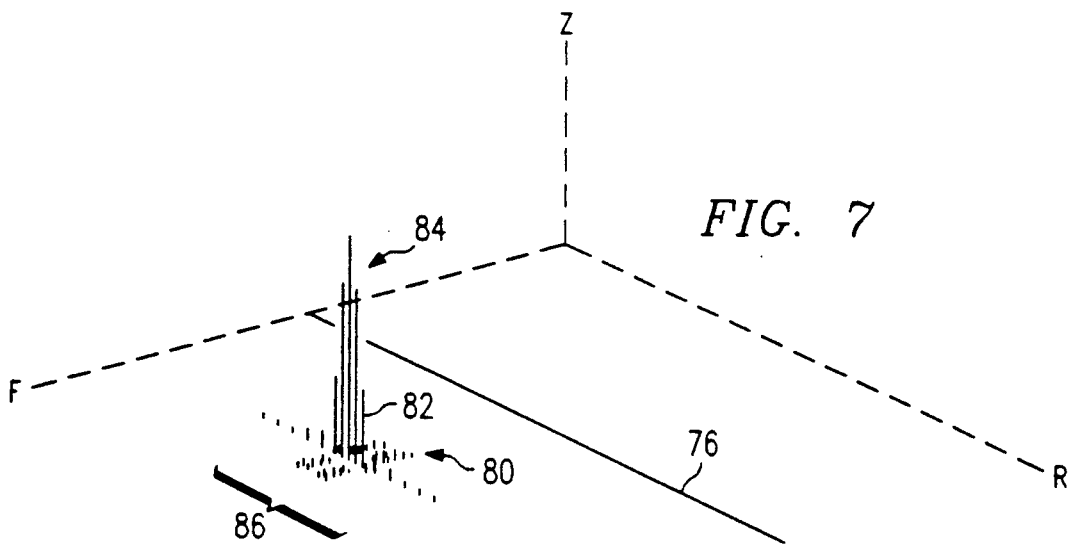

ISAR IMAGING RADAR SYSTEM

TECHNICAL FIELD OF THE INVENTION

The present invention relates to electromagnetic signal processing and, more particularly, to a method and system for improving inverse synthetic aperture radar (ISAR) signal processing including a computational technique for increasing doppler resolution for ISAR systems.

BACKGROUND OF THE INVENTION

Inverse Synthetic Aperture Radar (ISAR) processing is a technique for generating a three-dimensional (range, doppler, and intensity) image of a complex radar target. This kind of image allows a radar operator to classify targets at ranges beyond those available using visual methods. ISAR system operational effectiveness in classifying ships is clearly observable in the An/APS-137(V) radar systems on the P-3, CS-3B, and C-130 surveillance aircraft. Additionally, surface platforms such as cruisers and fast patrol boats are attractive platforms for these types of radar systems. Recently, ISAR systems have proven effective for classifying aircraft in a variety of applications.

The Navy/Marine surveillance community recognizes the value of ISAR systems. At the same time, the community recognizes that ISAR processing methods and systems employing this methods fall short of their full potential use. To address this problem, some designers seek to improve range resolution of ISAR systems. For example, Advanced Profile, a radar test bed system having ISAR capability, shows the value of improved resolution. The Advanced Profile test bed system classifies smaller targets and permits operators to examine finer detail on larger aircraft. This yields improved classification results and enhanced damage assessment capabilities.

For known systems, component capabilities limit resolution improvement. For example, fielded ISAR systems use surface acoustic wave (SAW) filters to achieve high range resolution. These analog devices become more difficult to produce as the time-bandwidth product increases. Following impulse compression and down-conversion to baseband, these systems digitize a compressed waveform and digitally process doppler (cross-range) dimensions. In these systems, however, throughput capability of the analog-to-digital conversion, buffering, and digital processing limit resolution.

Known ISAR systems also have a "dynamic" limitation on resolution improvement. Target movement of a few tenths of a wavelength during an aperture time causes phase modulation of the return signal. Special processing of this phase modulation results in the cross-range dimension of an image. The cross-range resolution relates to the aperture time. However, larger-scale motion of the target during aperture formation causes amplitude modulation of the return signal.

Amplitude modulation of the return signal causes cross-range dimensional spreading of the return signal spectrum. Spreading of the return signal spectrum is known as doppler smearing. Doppler smearing causes the cross-range resolution to degrade. Thus, known systems reach a point where increasing a pulse bandwidth actually degrades the cross-range resolution. This is contrary to the expected improved range resolution which should occur with increasing bandwidth. In fact, no improvement in range resolution can occur, because of target drifts in range. For example, if a target drifts in range a distance that is significant relative to the range resolution for a particular bandwidth, it is likely that degraded range resolution will occur. The doppler smearing that occurs in the ISAR image is said to be the result of "range migration."

Consequently, there is a need for a method and system to overcome the doppler and range resolution problems that range migration causes.

There is a need for an ISAR processing method and system that improves doppler and range resolutions but is not limited by the input capability of analog-to-digital conversion, buffering, and digital processing components of known ISAR systems.

Further, there is a need for a method and system that overcomes doppler frequency smearing effects that exist in known ISAR systems.

SUMMARY OF THE INVENTION

In accordance with the present invention, an improved ISAR radar method and system is provided that enhances doppler resolution by using a computational method that eliminates from the received ISAR signals the effects of range migration that cause doppler smearing.

According to one aspect of the present invention, there is provided a method for improving ISAR image processing by eliminating range migration effects from a moving object. The method of the present invention comprises the steps of first generating an inverse synthetic aperture radar (ISAR) image for zero doppler range cells. The method performs this step by averaging the IQ data for each range bin over all pulses from the sensor. Next, the method includes the step of compensating each of the data points by a factor representing the effect of non-zero doppler frequency shifts in the data points. The method further includes forming the ISAR image by applying the doppler filter to the compensated datapoints.

The method and system of the present invention embodies a computational procedure that properly computes the range/doppler image for constant velocity targets. Compared with the known ISAR doppler processing methods, the present invention avoids the generation of spurious ISAR images. The result is a higher resolution range and doppler image of moving targets.

BRIEF DESCRIPTION OF THE DRAWINGS

A more complete understanding of the invention may be had by reference to the following Detailed Description when taken in conjunction with the accompanying drawings, wherein:

FIG. 1 is a simplified block diagram of an ISAR video processing subsystem which may employ the ISAR processing method and system of the preferred embodiment;

FIG. 2 provides a conceptual illustration of non-zero doppler frequency shift occurring in an ISAR image;

FIG. 3 shows the effect of the non-zero doppler frequency shift on the IQ data for the ISAR image;

FIG. 4 illustrates the vector orientations for the IQ signals of an ISAR system when no doppler frequency shift occurs;

FIG. 5 shows the resulting vector diagram that illustrates the effect of doppler smearing from non-zero doppler frequency shifts from a target;

FIG. 6 shows the range migration effects that exist with no target velocity;

FIG. 7 further illustrates the effect of doppler smearing in ISAR imaging;

DETAILED DESCRIPTION OF THE INVENTION

Figure 9:
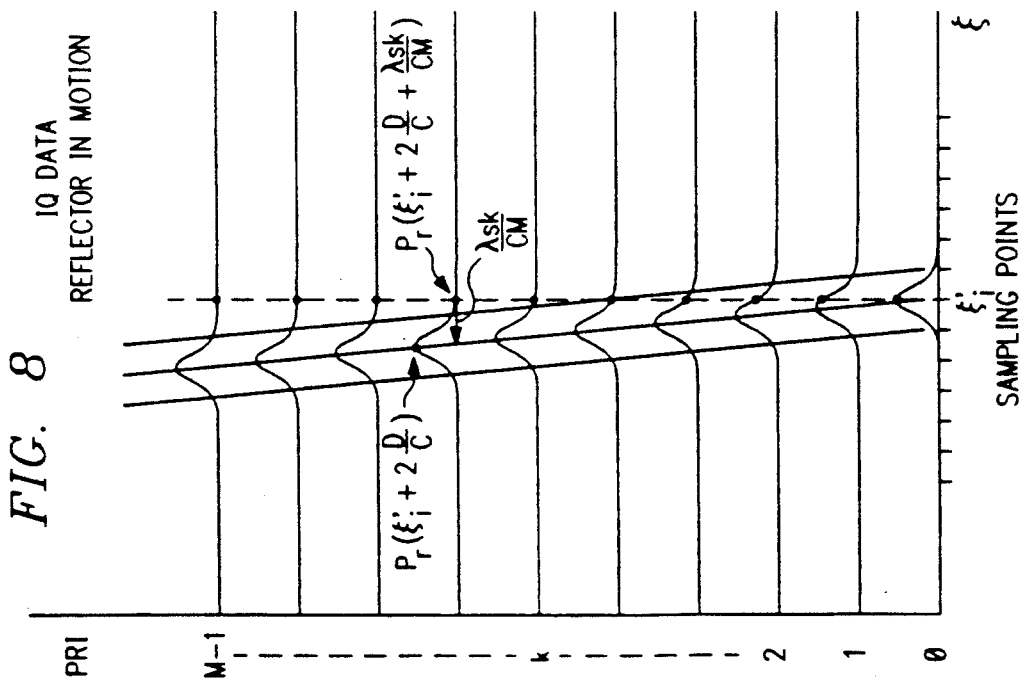
FIG. 9 illustrates the concept of banding a plurality of individual cells for computational simplification.

In the current ISAR system design, a range/doppler image is formed by Fast Fourier Transform (FFT) processing of the coherent data sampled off the returned signal. The essential role played by the FFT is that of a doppler filter bank. While the processing is straightforward and simple, it can also be shown that the resulting image is an approximation of the desired image. In particular, the use of the original IQ data to produce the non-zero doppler shifted ISAR image results in doppler frequency smearing in the resulting image.

FIG. 1 is a block diagram of a current ISAR video processing sub-system 20. IF signal 22 goes to coherent detector 24 as does output from digital phase shifter 26. Coherent detector 24 provides analog input to A/D converter 28, which also receives delayed trigger input from delayed trigger generator 30. Digital output from A/D converter 28 goes to data expander 32. Data expander 32 signals go to range/doppler tracker 34 and doppler processor 36. Range/doppler tracker 34 sends output signals to digital phase shifter 26, which also receives IF reference signal 38 for generating phase shift signals to coherent detector 24. Range/doppler tracker 34 also sends tracking input to delayed trigger generator 30. Doppler processor 36 outputs ISAR data to display memory 40 which sends digital signals to D/A converter 42. Video display 44 displays the analog signals from D/A converter 42.

It is in doppler processor 36 that the method and system of the preferred embodiment has application. Doppler processor 36 uses IQ data to determine the doppler imaging of targets as a function of the wave coordinate variable $\xi$ for each range bin index i and time t measured from the beginning of a time aperture for each pulse repetition index (PRI),$\kappa$. For example, denote by $$f(\xi_i, t_\kappa); \text{ for } i = 0, 1, 2, \ldots, N-1; \text{ and } \kappa = 0, 1, \ldots, M-1 \quad (1)$$

the collected IQ data, where i is the range bin index and $\kappa$ is the PRI index of the ISAR system. The range/doppler image for each range bin is formed by FFT processing. FFT processing transforms its time series into a frequency spectrum.

Using a point reflector representation, explicit expressions for range/doppler image formation may be derived in the following manner. Let the processed return echo from a point reflector be denoted by $P(\xi)$, where $$\xi = t' - \frac{2R(t)}{c}, \quad (2)$$

t' is the time measured from each pulse transmission, and t is the time measured from the beginning of each time aperture. Strictly speaking, R(t) is the range from the ISAR system sensor to the point reflector at the time of pulse arrival. For practical purposes, t may be approximated as $\kappa \Delta t$, where $\kappa$ is the PRI index number and $\Delta t$ is the time interval between pulses. The role of the range/doppler tracker in FIG. 1 is to lock on a dominant reflector as the reference and to insure that each returned pulse from this reference reflector is always sampled at the same pulse waveform coordinate values (i.e., $\xi_i$, for $i = 0, 1, \ldots, N-1$). Therefore, we have $$\xi_i = t_i' - \frac{2R_r(\kappa \Delta t)}{c} \quad (3)$$

for $i = 0, 1, \ldots, N-1$, and $R_r(\kappa \Delta t)$ is the reference reflector range.

Thus, at each PRI the sample times $t_i$ are continually adjusted to compensate for the variations in $R_r(\kappa \Delta t)$ so that the sequence of sample coordinate points for the reference reflector remain constant. For an arbitrary point reflector at range $R(\kappa \Delta t)$ from radar, its differential range from the reference reflector is denoted by the symbol $$\delta R(\kappa \Delta t) = R_r(\kappa \Delta t) - R(\kappa \Delta t), \quad (4)$$

and the sampled data for a returned pulse wave form from this reflector is $$P\left(\xi_i + \frac{2\delta R(\kappa \Delta t)}{c}\right) e^{j 4\pi \frac{\delta R(\kappa \Delta t)}{\lambda}}; \quad (5)$$

for $i = 0, 1, \ldots, N-1$, where $\lambda$ is the wave length.

To understand the practical significance of $\delta R(\kappa \Delta t)$, refer to FIG. 2. FIG. 2 shows ship 50 floating on the water surface 52 and moving about its center of buoyancy 54. As can be seen, the side-to-side distance that point 56 of mast 58 travels is considerably smaller than the side-to-side distance that point 60 travels. If ISAR sensor 62 senses that in the same plane as arbitrary point 64 on mast 58, a reference distance $R_r(\kappa \Delta t)$ may be established. Perpendicular to the plane of sensor 62 and arbitrary point 64 may be set vertical plane 66. From vertical plane 66 to point 60 may be determined the distance $R(\kappa \Delta t)$. This is true for any point on mast 58. The differential range $\delta R(\kappa \Delta t)$ may be defined by Equation (4) as the difference between $R_r(\kappa \Delta t)$ and $R(\kappa \Delta t)$ for any point on mast 58 pertaining to the distance $R(\kappa \Delta t)$.

With this foundation, the following describes mathematically the range migration effects. The ship 50 of FIG. 2, for example, consists of a number of point reflectors having diverse locations and dynamics. The following assumptions may be made with regard to this example. The ISAR system incorporates a range tracker that tracks one of the reflectors, called the reference reflector, for example point 64 of mast 58, and uses the tracker information to maintain the reference reflector in the center of the sampling window. The second assumption is that the ISAR processor computes the phase of return signals relative to the phase of the signal return from the reference reflector.

With these assumptions, the sampled return from an arbitrary reflector is given by $$f(\xi_i, t_k) = P\left(\xi_i + \frac{2[D - V\kappa \Delta t]}{c}\right) e^{-j\left(\frac{4\pi[V\kappa \Delta t - D]}{\lambda}\right)}, \quad (6)$$

where

κ indexes the pulse number within the aperture (κ = 0, 1, ..., M−1);

i indexes the sample number within one pulse return (i = 0, 1, ..., N−1);

P(ξ) is the complex envelope of the transmitted pulse; and P(ξ$_i$) is a sampled version of that envelope;

D is the initial displacement between the reference reflector and the arbitrary reflector;

V is the linear velocity of the arbitrary reflector along the radar line-of-sight, relative to the reference reflector;

Δt is the pulse repetition interval;

c is the speed of wave propagation; and

λ is the wavelength of the radar signal.

The data may be processed in cross-range by performing an M-point FFT on the data from corresponding sample times of M pulses. The resulting two-dimensional image is given by $$F(\xi_i, m) = \frac{1}{M} e^{j\frac{4\pi D}{\lambda}} \sum_{\kappa=0}^{M-1} P\left(\xi_i' + \frac{2[D - V\kappa\Delta t]}{c}\right) e^{-j2\pi\kappa\left(\frac{2V\Delta t}{\lambda} + \frac{m}{M}\right)} \quad (7)$$

where m indexes the spectral component.

The amplitude modulation (in the cross-range dimension) of the return signal samples is due to the term $2[D - V\kappa\Delta t]/c$ in the envelope function in Equation (6). The effect of this modulation is shown graphically in FIG. 3. During the aperture time, a given reflector's range changes relative to the reference reflector when its reflection is measured by the total number of sample times at which it is accessed.

The effect of range migration on the cross-range dimension is more easily discussed if we modify Equation (7) slightly. For an aperture time of MΔt, the spectral resolution is 1/MΔt. Assume that the target reflectors can have only discrete values of velocity, with velocity resolution corresponding to spectral resolution, i.e., a reflector will have a velocity that will be some multiple of λ/2MΔt. Substituting for V in Equation (7), with the integer variable s indexing discrete speed, we have $$F(\xi_i, m) = \quad (8)$$

$$\frac{1}{M} e^{j\frac{4\pi d}{\lambda}} \sum_{\kappa=0}^{M-1} P\left(\xi_i' + \frac{2}{c}\left[D + \frac{s\lambda\kappa}{2M}\right]\right) e^{j\frac{2\pi\kappa}{M}(s-m)}$$

The next step of the preferred embodiment technique is to evaluate this expression with m = s+1. This is similar to evaluating the response in the spectral cell adjacent to the cell representing the actual target speed. Ideally, the adjacent cell response will be zero. With this substitution, Equation (8) becomes $$F(\xi_i, m) = K \sum_{\kappa=0}^{M-1} P\left(\xi_i' + \frac{2}{c}\left[D + \frac{s\lambda\kappa}{2M}\right]\right) e^{-j\frac{2\pi\kappa}{M}} \quad (9)$$

In this equation, note that the complex exponential inside the summation represents M complex numbers uniformly distributed on the unit circle. If the weights associated with the complex numbers, given by P(...), were all the same, then the summation result would be zero. The range migration term, sλκ/2M, causes the P(...) terms to change in magnitude from one pulse to the next. This prevents the null from occurring. See FIG. 5, below. Thus, a constant-speed reflector causes response in several spectral cells. This represents resolution degradation in the cross-range direction.

FIGS. 4 and 5 illustrate the idea and actual adjacent cells spectral response. FIG. 4 shows a 360° vector representation of the function, $$\sum_{K=0}^{M-1} e^{-j\frac{2\pi m\kappa}{M}}$$

that drives Equation (8). If there were not doppler smearing, the resultant from all of the vectors 70 that FIG. 4 shows would equal zero. This would be the ideal case for no doppler smearing. In actuality, because of the doppler smearing that the IQ data generates and which FIG. 3 shows, the resultant 72 of FIG. 5 appears. This is because as the PRI index changes, different values of sample signals will result for each of the vectors 70. The method of the preferred embodiment compensates for the resultant doppler frequency shifts occurring from the target.

FIG. 6 shows a graphical presentation of the results arising from a computer simulation of the range migration effects. FIG. 6 plots amplitude (Z) versus range (R) and cross-range (F). Line 76 in the R-F plane is the zero doppler spectral cell. The samples 78 shown represent 200-MHz sampling of a Gaussian pulse, 6.25-ns wide at the half-power points. There are 32 range samples by 128 cross-range samples. This example shows what occurs when the reflector has no velocity. This results in the reference transmitted waveform.

FIG. 7 shows the spurious images that range migration causes in the ISAR images. In FIG. 7, spectral side lobes are apparent. The first side lobe appears at approximately the 21-dB down point from the main response. Additionally, distortion and widening of the response exist in the range dimension.

As implied by Equation (8) and demonstrated in FIG. 3, resolution degradation is due to amplitude modulation of the sampled waveforms. The form of Equation (8) permits compensating for range migration in the following way:

$$F(\xi_i^s, m) = \quad (10)$$

$$\frac{1}{M} e^{j\frac{4\pi D}{\lambda}} \sum_{\kappa=0}^{M-1} P\left(\xi_i^s + \frac{2}{c}\left[D + \frac{s\lambda\kappa}{2M}\right]\right) e^{j\frac{2\pi\kappa}{M}(s-m)}$$

where $$\xi_i^s = \xi_i' - \frac{2s\lambda\kappa}{c2M} \quad (11)$$

is the time of the i$^{th}$ range sample, adjusted to track a target with speed s, and ξ' is the sample time of the i$^{th}$ range sample of the reference reflector. For a reflector with speed s (relative to the reference reflector), the following is true:

$$F_s(\xi_i^j, m) = \frac{1}{M} e^{j\frac{4\pi D}{\lambda}} \sum_{\kappa=0}^{M-1} P\left(\xi_i^j + \frac{2D}{c}\right) e^{j\frac{2\pi\kappa}{M}(s-m)} \quad (12)$$

Figure 8:
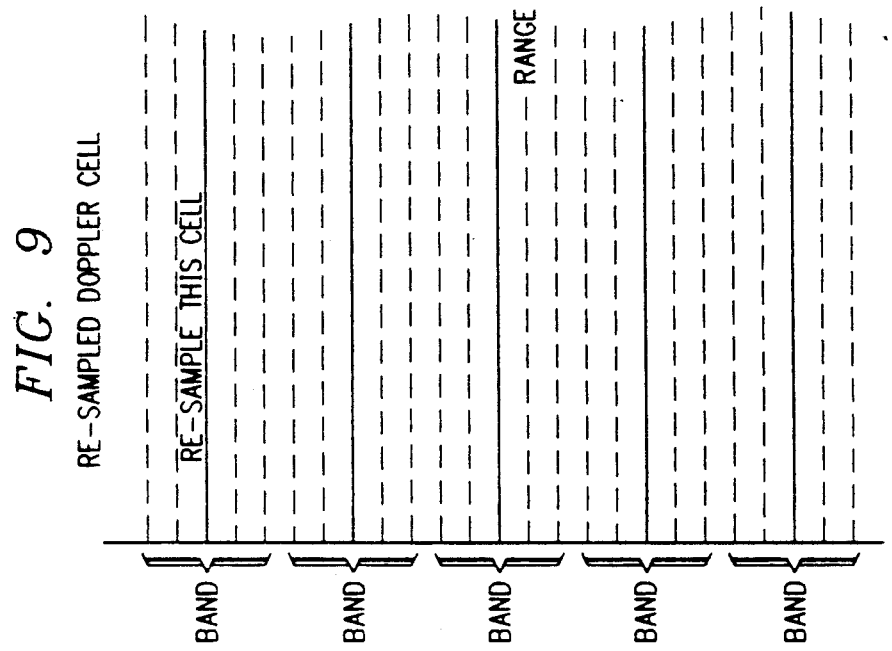
FIG. 8 shows how the preferred embodiment corrects the data point sample for an ISAR image.

FIG. 8 shows how the change of the real-time expression of Equation (12) causes an appropriate modification of the ISAR image to eliminate doppler smearing.

The discussion that follows more particularly addresses interpolation techniques usable to obtain the adaptive sampling process that Equation (12) implies. Various interpolation techniques (e.g., sin(x)/x interpolation, spline interpolation, etc.), may be used in accordance with the preferred embodiment, each of which involves compensation performance and computational requirements for implementation.

To gain additional insight into the method of the preferred embodiment, consider the case of a constant reflector velocity with $$V = -\frac{\lambda f_d}{2} = -\frac{\lambda s}{2M\Delta t} \quad (13)$$

where $f_d$ is the associated doppler frequency shift. For convenience in the following discussions, let the doppler index number s be restricted to integer values only. It may be stated that $$\delta R(t_7\kappa) = D - V\kappa\Delta t = D + \lambda s\kappa/2M \quad (14)$$

The sampled data from a returned echo off a constant velocity reflector is $$f(\xi_i, t_k) = P\left(\xi_i^j - 2\frac{D}{c} + \frac{\lambda s\kappa}{cM}\right) e^{j4\pi\frac{D}{\lambda}} e^{j2\pi\frac{s\kappa}{M}} \quad (15)$$

for $i = 0, 1, \ldots, N-1$; and $\kappa = 0, 1, \ldots, M-1$. The corresponding range/doppler image is constructed by taking the FFT of the sampled IQ data, yielding the following expression $$F(\xi_i, m) = \quad (16)$$

$$e^{j4\pi\frac{d}{\lambda}} \left(\frac{1}{M}\right) \sum_{\kappa=0}^{M-1} P\left(\xi_i^j + 2\frac{D}{c} + \frac{\lambda s\kappa}{cM}\right) e^{j2\pi\frac{(s-m)}{M}\kappa};$$

for $i = 0, 1, \ldots, N-1$; and $m = 0, 1, \ldots, M-1$.

A detailed examination of the Equation (16) shows the following:

(1) The main doppler image appears in doppler cell $m = s$.

(2) When the reflector velocity is zero (i.e., $s = 0$), the zero doppler cell range line image is $$F(\xi_i, 0) = e^{j4\pi\frac{D}{\lambda}} P\left(\xi_i^j + 2\frac{D}{c}\right); \quad (17)$$

for $i = 0, 1, \ldots, N-1$. The zero doppler cell image is a sampled retrace of the reference pulse waveform and there is no image in any of the other doppler cells.

(3) When a reflector is in motion relative to the reference reflector, then certain complicating factors arise. For example, consider the cases for $v < 0$ (i.e., $s > 0$). The main doppler cell image is obtained from Equation (16) by setting $m = s$, $$F(\xi_i, s) = e^{j4\pi\frac{D}{\lambda}} \left(\frac{1}{M}\right) \sum_{\kappa=0}^{M-1} P\left(\xi_i^j + 2\frac{D}{c} + \frac{\lambda s\kappa}{cM}\right); \quad (18)$$

for $i = 0, 1, \ldots, N-1$.

(4) In the doppler cells neighboring the main doppler cell s there are spurious images created by the doppler processing. Their expressions are obtained from Equation 16 by setting $m = s + l$, with $l = \pm 1, 2, \ldots$.

$$F(\xi_i, s+l) = \quad (19)$$

$$e^{j4\pi\frac{D}{\lambda}} \left(\frac{1}{M}\right) \sum_{\kappa=0}^{M-1} P\left(\xi_i^j + 2\frac{D}{c} + \frac{\lambda s\kappa}{cM}\right) e^{-j2\pi\frac{lk}{M}};$$

for $l = \pm 1, 2, 3, \ldots$; and $i = 0, 1, \ldots, N-1$. The summation in Equation (12) is non-zero because the sampled data taking at different points along the return pulse are not of the same value. This situation obviously becomes more severe at high doppler cells.

(5) Summarizing all the above, the present ISAR processing procedure only correctly constructs the zero doppler cell image. Doppler frequency smearing due to spurious doppler frequencies will occur at higher doppler cells. In addition, the range line image also contains the image of the pulse waveform rather than that of the point reflector used in the modeling process.

The present invention improves the current ISAR system design by providing an alternate processing procedure that circumvents the problems that cause the doppler frequency smearings. Referring again to FIG. 1, the present invention modifies doppler processor 36 by providing a way to perform the following computational procedure;

(1) The zero doppler cell image is generated by the simple summation $$F(\xi_i, 0) = \left(\frac{1}{M}\right) \sum_{\kappa=0}^{M-1} f(\xi_i, t_k); \quad (20)$$

for $i = 0, 1, \ldots, N-1$.

(2) For doppler cells associated with a reflector in motion, the coherent IQ data collected by the present ISAR system cannot be directly used for doppler processing. Because of the associated motion, range migration causes a gradually shift of the sampling points from pulse to pulse. This is clearly indicated in the right hand arguments of Equations (16), (18) and (19). The preferred embodiment circumvents this smearing by re-sampling the IQ data. Re-sampling is carried out specifically for each doppler cell. For example, consider the positive doppler frequency shift cells $0 = s - (M/2) - 1$. For each s, $$f(\zeta_i, t_k) = f\left(\xi_i - \frac{\lambda s\kappa}{cM}, t_k\right); \quad (21)$$

for $i = 0, 1, \ldots, N-1$; $\kappa = 0, 1, \ldots, M-1$.

The re-sampled data is used to compute the s doppler cell image by using $$F(\zeta_i,S) = \left(\frac{1}{M}\right)\sum_{\kappa=0}^{M-1} f(\zeta_i,t_k)e^{-j2\pi\frac{sk}{M}}; \qquad (22)$$

for i=0, 1, ..., N−1.

(3) For negative doppler frequency shift cells s, (M/2)≦s≦M−1, the corresponding equations for re-sampling and then computing the main doppler cell s are $$f(\zeta_i,t_k) = f\left(\xi_i + \frac{\lambda(M-s)\kappa}{cM}, t_k\right). \qquad (23)$$

for i=0, 1, ..., N−1, and κ=0, 1, ..., M−1. and then, again, forming the image with the construction $$F(\zeta_i,S) = \left(\frac{1}{M}\right)\sum_{\kappa=0}^{M-1} f(\zeta_i,t_k)e^{-j2\pi\frac{sk}{M}}; \qquad (24)$$

for i=0, 1, ..., N−1. Steps (1)-(3) remove the doppler cell smearing that occurs in the present generation of ISAR systems. Because this is a purely computationally procedure; it may be implemented in existing circuitry of doppler processor 36, or with a minimum of additional computational capability.

The preceding description of the preferred embodiment focuses on only point reflectors of the sensed target. The method of the preferred embodiment, however, applies to an entire target according to the formula $$f(\xi_i,t_k) = \sum_h P\left(\xi_i{}^j + 2\frac{D_h}{c} - \frac{\lambda s\kappa}{cM}\right)e^{j4\pi\frac{D_h}{\lambda}}e^{j2\pi\frac{s\kappa}{M}}. \qquad (25)$$

=0, 1, ..., N−1; κ=0, 1, ..., M−1; and where h represents each of the point sources on the sensed target. With the formulation of Equation (25), the preferred embodiment may be employed to compensate for doppler smearing from all point sources on the sensed target.

While in theory the re-sampling is specific for each doppler cell, in practice the differences in the re-sampling is very small for neighboring doppler cells. Because the method of the preferred embodiment may be computationally complex and since variations from doppler cell to doppler cell usually is comparatively inoquous, however, it may be desirable to simplify the method by selectively compensating for doppler smearing. FIG. 9 shows a scheme of dividing the doppler range into bands with re-sampling only for each band by specifically resampling only the center doppler cell in each band.

Although the present invention and its advantages have been described in detail, it should be understood that various changes, substitutions and alterations can be made herein without departing from the spirit and scope of the invention as defined by the appended claims.

What is claimed is:

1. A method for improving ISAR imaging radar signal processing to compensate for range migration effects in the ISAR signal from a moving reflector, comprising the steps of:

measuring the sampled return, $f(\xi_i, t_\kappa)$ where i is the range bin index of the ISAR signal and κ is the ISAR signal PRI index, according to the formula, $$f(\xi_i,t_k) = \sum_h P\left(\epsilon_i{}' + 2\frac{D_h}{c} + \lambda\frac{sk}{cM}\right)e^{j4\pi\frac{D_h}{\lambda}}e^{j2\pi\frac{sk}{M}},$$

for i=0, 1, ..., N−1, κ=0, 1, ..., M−1, and h representing a point source of the reflector;
resampling said return according to the formula $$f(\zeta_i,t_k) = f\left(\xi_i - \frac{\lambda sk}{cM}, t_k\right).$$

for
i=0, 1, ..., N−1; and κ=0, 1, ..., M−1, for positive doppler frequency shift cells, 0<s≦M/2−1, and computing the ISAR image from said cell compensations according to the formula $$F(\zeta_i, S) = \left(\frac{1}{M}\right)\sum_{k=0}^{M-1} f(\zeta_i, t_k) e^{-j2\pi\frac{sk}{M}};$$

for i=0, 1, ..., N−1; and
resampling said return according to the formula $$F(\zeta_i, t_k) = f\left(\xi_i + \frac{\lambda[M-s]k}{cM}, t_k\right)$$

for i=0, 1, ..., N−1; and κ=0, 1, ..., M−1, for negative doppler frequency shift cells, M/2≦s≦M−1, and computing the ISAR image from said cell compensations according to the formula $$F(\zeta_i, S) = \left(\frac{1}{M}\right)\sum_{k=0}^{M-1} f(\zeta_i, t_k) e^{-j2\pi\frac{sk}{M}};$$

for i=0, 1, ..., N−1;
where:
ξ is the wave coordinate variable
t=time
D is the initial displacement between the reference reflector and the arbitrary reflector
s is n integer variable indexing discrete speed
κ indexes the pulse number within the aperture
λ is the wave length of the radar signal
c is the speed of wave propagation
i indexes the sample number within one pulse return
P(ξ) is the complex envelope of the transmitted pulse
P'(ξ_i) is a sampled version of P(ξ).

2. A method for removing range migration effects from an inverse synthetic aperture radar image of a moving object, comprising the steps:

(a) generating a synthetic aperture radar image in the zero doppler cells of the object by summing a plurality of imaging synthetic aperture radar data points from the object;

(b) compensating each of said data points by a factor representing the effect of non-zero doppler frequency shift on said data points;

(c) compensating said generating synthetic aperture radar image for non-zero doppler frequency shift from the object using said compensating data points, thereby removing from said synthetic aperture radar image said range migration effects.

3. The method of claim 2, wherein said data points represent IQ data according to the following expression $$f(\xi_i, t_k) = P\left(\xi_i{}' + 2\frac{D}{c} + \frac{\lambda s\kappa}{cM}\right) e^{j4\pi \frac{D}{\lambda}} e^{j2\pi \frac{s\kappa}{M}}.$$

for $i = 0, 1, \ldots, N-1$, and $\kappa = 0, 1, \ldots, M-1$, for each i-th range bin index of a synthetic aperture radar system and each k-th pulse repetition index of said system;
where:
 $\xi$ is the wave coordinate variable
 t = time
 D is the initial displacement between the reference reflector and the arbitrary reflector
 s is n integer variable indexing discrete speed
 $\kappa$ indexes the pulse number within the aperture
 $\lambda$ is the wave length of the radar signal
 c is the speed of wave propagation
 i indexes the sample number within one pulse return
 $P(\xi)$ is the complex envelope of the transmitted pulse
 $P'(\xi_i)$ is a sampled version of $P(\xi)$.

4. The method of claim 2, wherein said image is formed according to the formula, $$F(\xi_i, 0) = \left(\frac{1}{M}\right) \sum_{\kappa=0}^{M-1} f(\xi_i, t_k);$$

for $i = 0, 1, \ldots, N-1$.

5. The method of claim 2, wherein said compensation step compensates for the effect of non-zero doppler frequency shift according to the formula, $$f(\zeta_i, t_k) = f\left(\xi_i - \frac{\lambda s\kappa}{cM}, t_k\right);$$

for $i = 0, 1, \ldots, N-1$; $\kappa = 0, 1, \ldots, M-1$, for positive doppler frequency cells, for $0 < s \leq M/2 - 1$.

6. The method of claim 5, wherein said data point compensating step compensates said data according to the formula $$f(\zeta_i, t_k) = f\left(\xi_i + \frac{\lambda(M-s)\kappa}{cM}, t_k\right).$$

for $i = 0, 1, \ldots, N-1$, and $\kappa = 0, 1, \ldots M-1$, for negative doppler frequency cells, for $M/2 \leq s \leq M-1$.

7. The method of claim 5, wherein said image compensation compensates said image according to the $$F(\zeta_i, S) = \left(\frac{1}{M}\right) \sum_{k=0}^{M-1} f(\zeta_i, t_k) e^{-j2\pi \frac{sk}{M}};$$

for for $i = 0, 1, \ldots, N-1$, and $0 < s \leq M/2 - 1$.

8. The method of claim 2, wherein said data point compensating step compensates said data according to the formula $$f(\zeta_i, t_k) = f\left(\xi_i + \frac{\lambda(M-s)\kappa}{cM}, t_k\right);$$

for $i = 0, 1, \ldots, N-1$, and $\kappa = 0, 1, \ldots, M-1$, for negative doppler frequency cells, for $M/2 \leq s \leq M-1$.

9. The method of claim 8, wherein said image compensation compensates said image according to the formula $$F(\zeta_i, S) = \left(\frac{1}{M}\right) \sum_{k=0}^{M-1} f(\zeta_i, t_k) e^{-j2\pi \frac{sk}{M}};$$

for $i = 0, 1, \ldots, N-1$, and $M/2 \leq s \leq M-1$.

10. The method of claim 7, wherein said image compensation compensates said image according to the formula $$\xi = t' - \frac{2R(t)}{c}.$$

11. The method of claim 2, wherein each of said data points is grouped in to a plurality of data point bands for simplifying computational complexity of compensating said data points.

12. The method of claim 7, wherein each of said data points is grouped in to a plurality of data point bands for simplifying computational complexity of compensating said data points.

13. The method of claim 10, wherein each of said data points is grouped in to a plurality of data point bands for simplifying computational complexity of compensating said data points.

14. An improved ISAR system for removing range migration effects from an ISAR image from a moving object, comprising
 circuitry for generating a synthetic aperture radar image without regard for doppler frequency shift of the object by summing a plurality of imaging synthetic aperture radar points from the object;
 circuitry for compensating each of said data points by a factor representing the effect of non-zero doppler frequency shift on said data points and;
 circuitry for compensating said generated synthetic aperture radar image for non-zero doppler frequency shift from the object using said compensated data points, thereby removing from said synthetic aperture radar image said range migration effects.

15. The system of claim 14, further comprising circuitry for generating IQ data according to the formula, $$f(\xi_i, t_k) = \sum_h P\left(\epsilon_i + 2\frac{Dh}{c} - \frac{\lambda s k}{cM}\right) e^{j4\pi \frac{Dh}{\lambda}} e^{j2\pi \frac{sk}{M}}.$$

for i=0, 1, ..., N−1, κ=0, 1, ..., M−1, and h representing a point source of the moving object;
where:
    ξ is the wave coordinate variable
    t=time
    D is the initial displacement between the reference reflector and the arbitrary reflector
    s is n integer variable indexing discrete speed
    κ indexes the pulse number within the aperture
    λ is the wave length of the radar signal
    c is the speed of wave propagation
    i indexes the sample number within one pulse return
    P(ξ) is the complex envelope of the transmitted pulse
    P($\xi_i$) is a sampled version of P(ξ).

16. The system of claim 14, further comprising circuitry for generating said synthetic aperture radar image according to the formula:

$$F(\xi_i, 0) = \left(\frac{1}{M}\right) \sum_{\kappa=0}^{M-1} f(\xi_i, 0)$$

for i=0, 1, ..., N−1.

17. The system of claim 14, further comprising circuitry for compensating said data points according to the formula, $$f(\zeta_i, t_k) = f\left(\xi_i - \frac{\lambda s \kappa}{cM}, t_k\right);$$

for i=0, 1, ..., N−1; κ=0, 1, ..., M−1, for positive doppler frequency cells, with 0<s≦M/2−1.

18. The system of claim 14, further comprising circuitry for compensating said data points according to the formula, $$f(\zeta_i, t_k) = f\left(\xi_i - \frac{\lambda(M-s)\kappa}{cM}, t_k\right);$$

for i=0, 1, ..., N−1, and κ=0, 1, ..., M−1, for negative doppler frequency cells, for M/2≦s≦M−1.

19. The system of claim 17, further comprising circuitry for compensating said data points according to the formula:

$$f(\zeta_i, t_k) = f\left(\xi_i - \frac{\lambda(M-s)\kappa}{cM}, t_k\right);$$

for i=0, 1, ..., N−1, and κ=0, 1, ..., M−1, for negative doppler frequency cells, with M/2≦s≦M−1.

20. The system of claim 17, further comprising circuitry for compensating said generated synthetic aperture radar image according to the following formula, $$F(\zeta_i, S) = \left(\frac{1}{M}\right) \sum_{k=0}^{M-1} f(\zeta_i, t_k) e^{-j2\pi \frac{sk}{M}};$$

for i=0, 1, ..., N−1, and 0<s≦M/2−1.

21. The system of claim 18, further comprising circuitry for compensating said generated synthetic aperture radar image according to the following formula, $$F(\zeta_i, S) = \left(\frac{1}{M}\right) \sum_{k=0}^{M-1} f(\zeta_i, t_k) e^{-j2\pi \frac{sk}{M}};$$

for i=0, 1, ..., N−1, M/2≦s≦M−1.

22. The system of claim 19, further comprising circuitry for compensating said generated synthetic aperture radar image according to the following formula, $$F(\zeta_i, S) = \left(\frac{1}{M}\right) \sum_{k=0}^{M-1} f(\zeta_i, t_k) e^{-j2\pi \frac{sk}{M}};$$

for i=0, 1, ..., N−1, and M/2≦s≦M−.

23. The system of claim 14, further comprising circuitry for grouping a plurality of said data points into bands of data points for computational simplicity of said data point compensations.

24. The system of claim 15, further comprising circuitry for grouping a plurality of said data points into bands of data points for computational simplicity of said data point compensations.

25. The system of claim 19, further comprising circuitry for grouping a plurality of said data points into bands of data points for computational simplicity of said data point compensations.

* * * * *